Figure 1:
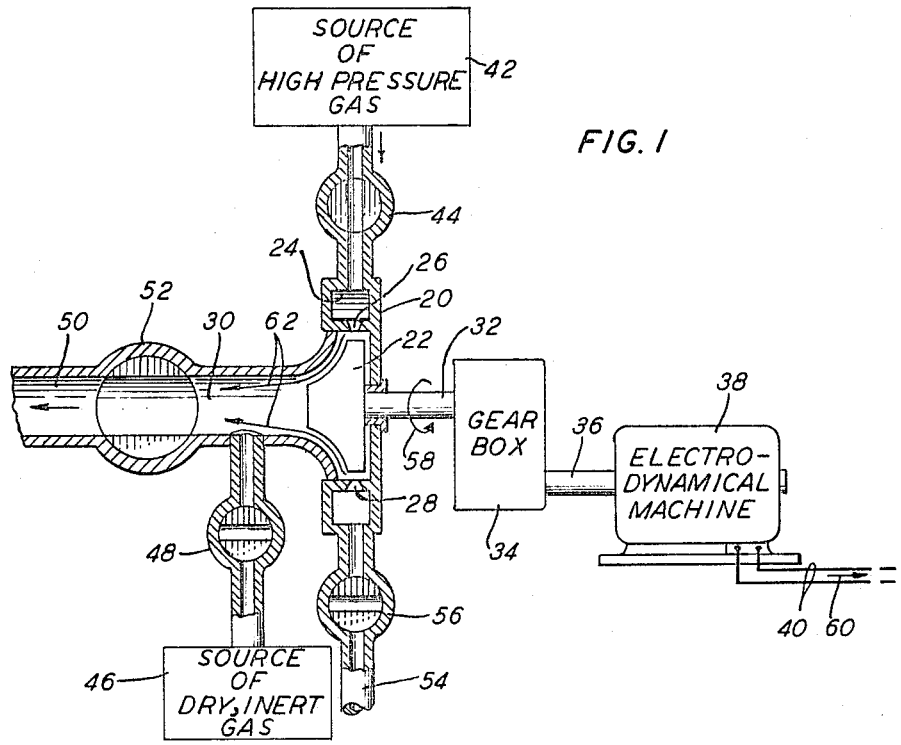

Sept. 27, 1966 H. C. MITCHELL 3,274,789
PROCESS FOR REMOVING CONGEALED IMPURITIES FROM A GAS EXPANDER
Filed March 26, 1965

INVENTOR
HAROLD C. MITCHELL
BY Jonathan Plant
ATTORNEY

3,274,789
PROCESS FOR REMOVING CONGEALED IMPURITIES FROM A GAS EXPANDER
Harold C. Mitchell, Glen Rock, N.J., assignor to Air Reduction Company, Incorporated, New York, N.Y., a corporation of New York
Filed Mar. 26, 1965, Ser. No. 443,052
12 Claims. (Cl. 62—85)

This invention relates to methods of removing congealed matter from cyrogenic devices having internal parts upon which material may be condensed during normal operation, and more particularly to methods which do not require removal of the device, for example an expansion engine, from its place in line in a cryogenic process in order to effect the removal of the congealed material.

An object of the invention is to reduce the out-of-service time for cleaning encountered in operating a cryogenic device as a part of a production line in a continuous cryogenic process.

More specifically, an object is to avoid the necessity of removing an expansion engine from the line for the purpose of removing congealed matter from the interior of the engine.

A general object of the invention is to increase the overall efficiency and reduce the operating cost of cryogenic processes which employ expansion engines.

A feature of the invention is the temporary operation of an expansion engine as a compressor in order to generate heat to melt the congealed matter within the engine and to blow the melted matter out through an exhaust valve.

A specific feature is the use of a dry, inert gas as the working fluid during the melting and blowing out operation.

The term cryogenic refers to that quality of temperature substantially below ambient, usually below about −100° F.

It is known that the efficiency of operation of any engine is likely to be impaired if moving parts become encrusted with congealed matter, commonly referred to in cryogenic devices as rime. In expansion engines used in cryogenic processes the problem of rime arises even though the process stream passing through the engine is free of water vapor and carbon dioxide. A common source of trouble comes from lubricating oil which is continually congealing upon the interior parts of the engine. Water vapor, carbon dioxide, condensable gases (hydrocarbons such as propane) as well as other materials, are also sometimes sources of congealed matter. In particular, in a turbine type expander, the inlet nozzles eventually become clogged by frozen oil particles. When this happens, it has been necessary heretofore to shut down the entire process, remove the clogged engine from the line, thaw it out, clean it, and later replace it in the line, a procedure which is time consuming and very costly.

The invention will be described with particular reference to a turboexpander of a type commonly used in cryogenic processes for the purpose of work-expanding a process gas stream which enters the expander at a relatively high pressure, does work in turning the expander and is exhausted at relatively lower pressure and temperature compared to the state of the stream upon entering the expander. The temperature of the expander is commonly sufficiently low to congeal lubricating oil and the like.

In accordance with the invention, in an illustrated embodiment the engine is provided with additional or auxiliary valves, an auxiliary inlet valve at the exhaust side of the engine and an auxiliary exhaust valve at the inlet side of the engine. During the normal operation of the engine, as an expander, the customary inlet and exhaust valves are open and the auxiliary valves remain closed. When deriming is required, the usual inlet and exhaust valves of the engine are closed and the auxiliary valves are opened. The closing of the usual inlet valve cuts off the supply of high pressure gas to the engine, thus stopping generator action in an electrodynamical machine such as is customarily geared to the engine through reduction gears. The rotor of the engine continues to spin due to its rotational intertia and at the same time for example the electric circuit to which the electrodynamical machine is customarily connected immediately begins to feed electrical power into the machine to keep the engine spinning and to cause it to act as a motor driven compressor or gas pump. The auxiliary inlet valve is connected to a supply of dry, inert gas, for example nitrogen. The engine acts upon this gas as a working fluid, compressing it and warming it by the resulting heat of compression, and pumping it out by way of the auxiliary exhaust valve, which may be vented to the atmosphere. The heated gas serves to melt the rime and by the pumping action of the engine the melted material in the liquid phase is entrained in the pumped gas and is blown out of the engine.

After a time sufficient to complete the deriming process, the auxiliary valves may be closed and the regular valves opened. This will reintroduce the stream of high pressure process gas which will keep the engine spinning and will immediately restore generator action, and return the plant to normal operation with minimum loss of time. Thus, since the engine need never be removed from the line for deriming, there is no lengthy interruption of the cryogenic process during deriming.

Whether or not a standby expander is provided, the invention saves the time and expense of dismantling and cleaning a clogged expander, and where a single expander is relied upon to serve a plant, the invention saves all but a relatively insignificant portion of the time during which the entire plant must be shut down for deriming the expander.

Of course the dry inert gas may be introduced into the expander for compression thereof at any convenient point, such as through the customary exhaust valve, the point of introduction discussed in this specification being merely illustrative.

Other features, objects and advantages will appear from the following more detailed description of an illustrative embodiment of the invention, which will now be given in conjunction with the accompanying drawings.

In the drawings:
FIGURE 1 is a schematic diagram of an embodiment of the invention, showing valves set for normal operating mode; and
FIGURE 2 is a schematic diagram of the same embodiment showing valves set for a deriming operation.

Figure 2:
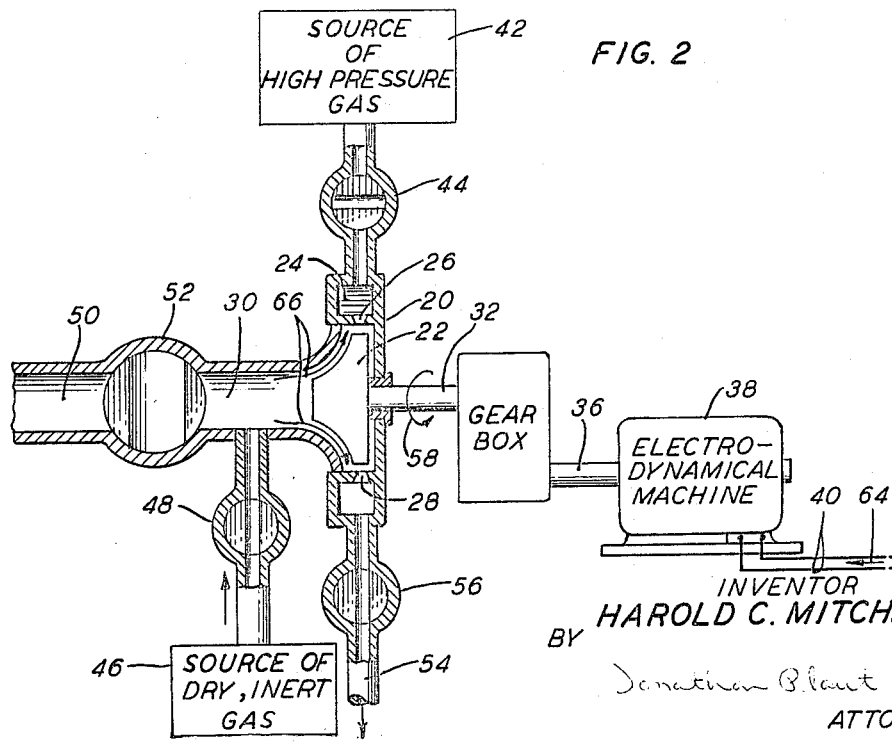

FIGURES 1 and 2 show the same structural features with different settings of the valves incorporated in the system shown, whereby two different modes of operation are obtained.

The system of FIGURE 1 or of FIGURE 2 comprises a rotary expansion engine having a casing 20, a turbine type rotor 22, a closed ring manifold 24 from which nozzles 26 and 28 are directed toward the rotor 22, and a conduit portion 30. The rotor 22 is mounted upon a shaft 32 that is journaled in the casing 20 in known manner. The shaft 32 is coupled through a gear box 34 and a shaft 36 to an electrodynamic machine 38 which is capable of performing either as an electrical generator or as an electric motor. The machine 38 has its electrical terminals connected to a power line 40.

A source 42 of high pressure gas is arranged for connection to the manifold 24 under the control of a valve 44. A source 46 of dry, inert gas for deriming is arranged for connection to the conduit 30 under the control of a valve 48. The conduit 30 is arranged for connection to a process line 50 under the control of a valve 52, and the manifold 24 is arranged for connection to a vent 54 under the control of a valve 56.

In the mode of operation shown in FIGURE 1, the valves 44 and 52 are open and the valves 48 and 56 are closed. The figure shows the normal mode of operation of the expansion engine. Gas under relatively high pressure from source 42 drives the rotor 22 which drives the electrical machine 38 as a generator of electricity, furnishing electrical power to the electrical circuit 40, wherein the power may be used for any desired purpose in known manner.

The high pressure gas from the source 42 passes through the valve 44 into the manifold 24 and thence through nozzles 26 and 28 to form jets which impinge in known manner upon blades or into passages in the rotor 22 to drive the rotor in rotary motion, turning the shaft 32, the gears in the gear box 34, the shaft 36 and the rotor of the electrical machine 38 to generate electric power in known manner. The direction of rotation of the shaft 32 is determined by the particular structure of the rotor 22 and is assigned an arbitrary direction in FIGURE 1, indicated by an arrow 58. The course of the electrical power generated by the machine 38 is away from the machine into the electric circuit, as indicated by an arrow 60. The gas expands to a lower pressure as it pushes against the opposing portions of the rotor and moves in centripetal fashion into the conduit 30 as indicated by arrows 62. From the conduit 30, the exhaust of expanded gas passes through the open valve 52 into the process line 50.

The expansion of the gas in the nozzles 26, 28, and in the vicinity of the rotor 22, reduces the temperature of the gas in known manner, with the result that any substance in or carried by the gas stream that is cooled to its freezing point is likely to congeal upon the nozzle or upon the rotor and ultimately the expansion engine will be clogged, as is well known in the operation of expansion engines. Even though the gas stream may contain no more than egligible amounts of substances congealable at the minimum temperature produced in the engine, the presence of lubricants in the journal will usually result in the presence of oil particles within the engine with the result that deposits of congealed matter are formed which eventually will need to be removed.

FIGURE 2 shows the system in the mode of operation for accomplishing deriming. In this case, valves 44 and 52 are closed and valves 48 and 56 are open. The high pressure gas input has been shut off, with the result that there is no mechanical power to drive the rotor, so that the electrical power in the power line 40 flows into the electrical machine 38 against the now reduced back electromotive force exerted by the machine 38. The course of the electrical power is now indicated by an arrow 64 directed from the power line to the machine 38, which is now operating as a motor to drive the rotor 22 by way of the shaft 36, the gear box 34 and the shaft 32. As is known from electrical practice as well as from electrical theory, the machine 38 as a motor runs in the same direction as it runs as a generator, and the rotor 22 accordingly runs in the same direction in both cases, as indicated by the arrow 58 in FIGURES 1 and 2. The rotor 22 when power driven from the shaft 32 operates as a compressor instead of as an expander. Dry, inert gas is admitted from the source 46 through the valve 48 into the conduit 30, wherein the gas is pumped by the rotor 22 and forced into centrifugal motion as indicated by arrows 66. The gas is compressed by the pumping action and is forced into the manifold 24 through the nozzles 26, 28, and out to the vent 54 through the valve 56.

The pumping action of the rotor 22 working upon the gas from source 46 as a working fluid, increases both the presure and the temperature of the gas within the casing 20, nozzles 26, 28, manifold 24, rotor 22, and conduit 30. Sufficient heat may be generated in this manner to melt the congealed material, and the pressure developed will produce sufficient gas velocity in the gas stream to entrain the melted material, in liquid phase, in the pumped gas stream and to carry it out through the vent 54.

When deriming has been completed, and it is desired to return the system to normal operation, it is only necessary to close valves 48 and 56 and open valves 44 and 52, thus restoring the system to the configuration shown in FIGURE 1. The pumping of the deriming gas will then cease and the re-entering high pressure gas will immediately resume driving the rotor. The electromotive force of the machine 38 will rise to such a value that it will overcome the opposing electromotive force of the power line 40, again causing the machine 38 to deliver electrical power to the power line.

The rotating machine parts do not stop spinning when the changeover is made in either direction between the states shown in FIGURES 1 and 2, respectively. In fact, the transition is made very smoothly with little or no fluctuation in speed.

It will be evident that the mechanical power developed by the expander may be used in any known manner, not necessarily limited to its use in driving an electrical generator. Also, when the machine is to be driven as a compressor or gas pump, it can be driven by any suitable mechanical means, not necessarily limited to an electric motor as the driving means. It will usually be most economical of power, however, to employ an electrodynamical machine both for receiving and delivering the required mechanical power.

The gas which drives the expander may be air, or a component of air, or any other process gas, such as methane, ethylene, propane, or other hydrocarbons, or fluorochlorohydrocarbons, for example Freons, etc., which may contain impurities or contaminants such as water vapor, oils, or hydrocarbons with higher freezing points than the substance to be expanded in the expander. The invention may also be applied with process streams of helium or hydrogen to be expanded, since these gases may contain impurities or contaminants that will condense and freeze out upon the inner parts of the expander.

The substance pumped during deriming is not limited to nitrogen or to any dry, inert gas, but may be any suitable gas, and in particular may be the same gas which the expander is designed to expand, in which case the warmed pumped gas is capable of melting, taking into entrainment and carrying off the impurities or contaminants which were condensed out of the same gas.

The structural details of design of the expander shown in the drawings is not intended to limit the scope of this disclosure, but merely rather be illustrative of the invention as described. While illustrative forms of apparatus and methods in accordance with the invention have been described and shown herein, it will be understood that numerous changes may be made without departing from the scope of the invention as defined by the following claims.

I claim:

1. The method of removing congealed matter from the interior of a gas engine operating normally as an expander, comprising operating the engine as a compressor for developing heat, passing a working gas through the engine to warm the gas for melting the congealed matter and for entraining the said melted matter and venting the working gas carrying the melted matter out of the engine along with the exhaust thereof.

2. The method of removing congealed matter from the interior of a gas engine operating normally as an expander, comprising the steps of alternately operating the engine as an expander and operating the engine as a compressor for developing heat, pumping a working gas through the engine, thereby warming the working gas and causing it to melt the congealed matter and venting the working gas carrying off the melted congealed matter in the exhaust stream of the engine.

3. The method of removing congealed matter from the interior of a gas engine operating normally as an expander, comprising the steps of operating the engine for a period of time as a compressor, and feeding a dry, inert gas through the engine to compress and warm the dry, inert gas, whereby the said dry, inert gas is enabled to melt the said congealed matter, entrain the melted material, and vent the entrained melted matter along with the exhaust stream of the compressed dry, inert gas.

4. The method of preventing excessive accumulation of congealed matter in a gas engine operating normally as an expander, comprising the steps of alternately operating the engine as an expander during normal use and as a compressor for removing congealed matter, and running gas normally expanded by said gas engine through said engine during its operation as a compressor, whereby the said gas is compressed and heated enabling it to melt the congealed matter, entrain the melted matter, and vent the entrained matter along with the exhaust stream of compressed gas.

5. The method of removing congealed matter from the interior of a gas engine operating normally as an expander and which is equipped with inlet and exhaust valves at the normally inlet side of the engine and with inlet and exhaust valves at the normally exhaust side of the engine, which method comprises the steps of (a) closing the inlet valve and opening the exhaust valve at the normally inlet side of the engine; (b) opening the inlet valve and closing the exhaust valve at the normally exhaust side of the engine; (c) introducing dry, inert gas through the open inlet valve; and (d) driving the engine by external power as a compressor for a sufficiently long period of time to develop heat in the said dry, inert gas sufficient to melt the said congealed matter, entrain such melted matter in the stream of dry, inert gas, and carry the said entrained matter out through said open exhaust valve.

6. The method according to claim 5, together with the additional steps of (e) closing the inlet valve and opening the exhaust valve at the normally exhaust side of the engine; and (f) opening the inlet valve and closing the exhaust valve at the normally inlet side of the engine, thereby restoring the normal operation of the engine as an expander after removal of said congealed matter.

7. The method of removing congealed matter from the interior of a gas pressure-driven work-expansion engine comprising the steps of (a) shutting off the gas driving pressure; (b) driving the engine by external power without changing the direction of rotation, thereby operating the engine as a gas compressor; (c) admitting dry, inert gas into the engine at the normally exhaust side; (d) compressing said dry, inert gas by means of the engine to develop sufficient heat within the engine to melt the congealed matter therein; and (e) pumping said dry, inert gas through the engine for a sufficient time interval to carry out the melted matter by entrainment in the stream of pumped gas.

8. The method according to claim 7, with the additional step of (f) restoring the gas driving pressure and shutting off the application of external power to the engine, thereby restoring the operation of the engine as an expansion engine.

9. The method according to claim 7, said dry inert gas being nitrogen.

10. The method of removing congealed matter from the interior of a gas pressure-driven work-expansion engine which is connected in driving relationship to an electrodynamical machine capable of operating either as a generator or as a motor, said last mentioned machine being electrically connected to a power line to which it normally delivers electrical power, which method comprises the steps of (a) shutting off the gas driving pressure for the expansion engine; (b) admitting a second stream of gas into the engine at the normally exhaust side; (c) closing the exhaust valve at the normally exhaust side of the engine; (d) opening a vent at the normally inlet side of the engine, whereby the said power line drives the electrodynamical machine as a motor and the engine as a compressor, without change of direction of rotation, developing heat of compression in the second stream of gas, thereby melting said congealed matter; (e) pumping the heated second stream of gas through the engine for a period of time, thereby entraining the melted matter in second stream of pumped gas and carrying said entrained matter out of the engine through the vent.

11. The method according to claim 10, followed by the steps of (f) shutting off the second stream of gas; (g) closing said vent; (h) opening the exhaust valve of the engine; and (i) restoring the gas driving pressure to the engine, thereby restoring the entire system to normal operating.

12. The method according to claim 10, said second stream of gas being dry nitrogen gas.

References Cited by the Examiner

UNITED STATES PATENTS

| | | | |
|---|---|---|---|
| 2,084,474 | 6/1937 | Booth et al. | 62—87 X |
| 3,091,941 | 6/1963 | Becker | 62—87 X |
| 3,210,948 | 10/1965 | Schilling | 62—38 X |

ROBERT A. O'LEARY, *Primary Examiner.*

W. E. WAYNER, *Assistant Examiner.*